(12) United States Patent
Tarbotton et al.

(10) Patent No.: US 7,013,330 B1
(45) Date of Patent: Mar. 14, 2006

(54) DOWNLOADING A COMPUTER FILE FROM A SOURCE COMPUTER TO A TARGET COMPUTER

(75) Inventors: Lee Codel Lawson Tarbotton, Leicester (GB); Daniel Joseph Wolff, Aylesbury (GB); Paul Nicholas Gartside, Milton Keynes (GB); Graham Arthur Makinson, Oxford (GB); Nicholas Paul Kelly, Milton Keynes (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 943 days.

(21) Appl. No.: 09/678,692

(22) Filed: Oct. 3, 2000

(51) Int. Cl.
*G06F 15/16* (2006.01)

(52) U.S. Cl. ...................................... 709/219; 709/203

(58) Field of Classification Search ................ 709/219, 709/203, 217, 218, 224, 225, 208; 707/203

See application file for complete search history.

(56) References Cited

U.S. PATENT DOCUMENTS

| | | | |
|---|---|---|---|
| 6,002,852 A | * 12/1999 | Birdwell et al. | 709/203 |
| 6,003,082 A | * 12/1999 | Gampper et al. | 709/225 |
| 6,035,423 A | * 3/2000 | Hodges et al. | 714/38 |
| 6,269,456 B1 | 7/2001 | Hodges et al. | 714/38 |

* cited by examiner

*Primary Examiner*—Ario Etienne
*Assistant Examiner*—Barbra Burgess
(74) *Attorney, Agent, or Firm*—Zilka-Kotab, PC; Christopher J. Hamaty

(57) ABSTRACT

A source computer 2 having a copy of a computer file that it is desired to download to a plurality of target computers issues broadcast messages via a computer network linked to those target computers. The broadcast messages indicate the availability of the computer file for download and include a download qualifying parameter. The download qualifying parameter is used by receiving target computers to determine whether or not they qualify to attempt a download from the source computer in response to the received broadcast message. Only those target computers that do qualify attempt a download. The source computer monitors how many target computers make a download attempt in response to a particular broadcast message and adjusts the download qualifying parameters in subsequent broadcast messages so that the target computers progressively download the new computer file without overloading the source computer.

21 Claims, 8 Drawing Sheets

DOWNLOADING A COMPUTER FILE FROM A SOURCE COMPUTER TO A TARGET COMPUTER

BACKGROUND OF THE INVENTION

1. Field of the Invention

This invention relates to the field of data processing systems. More particularly, this invention relates to the downloading of a computer file from a source computer to a plurality of target computers.

2. Description of the Prior Art

It is known to provide systems that allow the downloading of a computer file from a source computer to a target computer via a computer network. An example of such a system is the way in which an anti-virus computer program may be scheduled to periodically check for and download updated versions of virus definition data files from a remote source computer, such as an FTP file server maintained by the anti-virus computer program provider.

In many circumstances it is desirable that a computer file should be distributed to the target computers concerned as rapidly as possible. An example of such a situation is the discovery of a new computer virus that results in the creation of new virus definition data for use in an anti-virus system. In order to protect the users of that anti-virus computer system from infection by the new virus, it is desirable that the updated virus definition data should be distributed to those users as rapidly as possible.

A problem that can arise with systems that allow for the downloading of a computer file from a source computer via a computer network is that at times of peak demand the download requests received can exceed the capacity of the source computer. In the case of a well publicised outbreak of a dangerous computer virus, then within a short period of time a large number of users of an anti-virus computer system may simultaneously seek to check for and update their computer virus definition data in order that it may deal with the new virus. Such a peak in demand for the download of a computer file in this way can disable the source computers such that the updated computer file cannot be distributed to even the most critical systems in a timely fashion.

A further system for the distribution of computer files for update purposes is described in the United States patent application entitled "SYSTEM AND METHOD FOR EFFICIENT DISTRIBUTION OF APPLICATION SERVICES TO A PLURALITY OF COMPUTING APPLIANCES ORGANIZED AS SUBNETS" filed on 30 Aug. 2000 under app. Ser. No. 09/650,983, and having a common Assignee to the present application. The disclosure of this co-pending application is incorporated herein by reference.

Measures that can allow for the rapid distribution of computer files across a computer network whilst avoiding excessive peaks in demand that can cause denial of service problems are strongly advantageous.

SUMMARY OF THE INVENTION

Viewed from one aspect the present invention provides a method of distributing a computer file from a source computer to a plurality of target computers via a computer network, said method comprising the steps of:

determining a demand level upon said source computer for downloading of said computer file to said plurality of target computers;

sending at least one download controlling message from said source computer to at least one of said plurality of target computers;

controlling downloading of said computer file by said at least one of said plurality of target computers in dependence upon said download controlling message; and adjusting said downloading controlling message in dependence upon said demand level.

The invention uses feedback control via the passing of messages between the source computer and the target computers such that the load on the source computer may regulated to avoid excessive download demand that could otherwise occur.

In preferred embodiments the invention provides a method in which said download controlling message includes a broadcast message, said method comprising the steps of:

issuing said broadcast message from said source computer to said plurality of target computers indicating availability of said computer file for download from said source computer, said broadcast message including at least one download qualifying parameter;

receiving said broadcast message at said plurality of target computer;

determining for each target computer of said plurality of target computers that received said broadcast message whether or not said target computer already has said computer file;

determining for each target computer that does not already have said computer file in dependence upon said at least one download qualifying parameter whether or not said target computer qualifies to download said computer file in response to said broadcast message;

downloading said computer file from said source computer to those target computers that do not already have said computer file and that qualify to download said computer file;

monitoring how many target computers download said computer file in response to said broadcast message; and adjusting at least one download parameter used in a following broadcast message issued by said source computer in dependence upon how many target computers downloaded said computer file in response to said broadcast message.

The invention utilises a broadcast technique whereby the source computer can rapidly notify listening target computers of the availability of a computer file for download. Coupled with this, the invention provides a download qualifying parameter within the broadcast message that is used to control whether receiving target computers qualify to initiate a download of that computer file. Thus, whilst the target computers are rapidly notified of the existence of the computer file, the source computer is able to control the number of target computers that seek to download the computer file. Thus, the download qualifying parameter may be adjusted by the source computer to match the capability of the source computer to service download requests. Adjustments need not necessarily take place upon every iteration (e.g. at the end of a download rollout the parameter may stay constant at a level qualifying all target computers).

In preferred embodiments of the invention, the download qualifying parameter is adjusted in a way such that the probability of a particular target computer qualifying to download on the basis of that parameter changes (normally increases) with the time. Thus, whilst the broadcast message may initially be set to qualify only a small number of target computers that receive that message, the probability of a target computer qualifying may be increased with time as more and more target computers will already have downloaded the computer file and so not make any further download request (causing excessive demand) even if they qualify on the basis of the download qualifying parameter.

In preferred embodiments of the invention, the source computer may control the download qualifying parameter such that the number of target computers downloading the computer file in response to a broadcast message does not exceed a predetermined threshold level (which may be calculated dynamically). The download qualifying parameter and the threshold level can be seen to form a type of feedback system whereby the download demand upon the source computer can be controlled to a level that makes efficient use of the capabilities of the source computer.

In preferred embodiments of the invention different target computers have different associated priority levels within a priority hierarchy. The download qualifying parameter may then specify what priority level a target computer must have in order to qualify for download.

This priority level arrangement allows for a managed/structured approach to the prioritisation of which target computers will receive a computer file first. Critical computers may be given a high priority level such that they quickly qualify for download and receive a new computer file early whereas less critical computers can be excluded from qualifying in order that the resource of the source computer is directed to where it is initially most effective. With time, the download qualifying parameter within the broadcast message may be adjusted to allow lower priority target computers to qualify for download such that eventually all target computers are capable of qualifying for the download.

In order to better spread the load and provide the capability for relatively fine feedback control it is preferred that the download qualifying parameter includes a random selection control parameter which may be used in conjunction with a quasi-random parameter generated by a receiving target computer to determine whether or not that target computer qualifies for download. Adjusting the random selection control parameter to vary the probability of the quasi-random parameter generated by a particular computer qualifying that computer for download enables a fine degree of control to be exercised over the number of target computers that will qualify for download in response to a particular broadcast message. It will be appreciated that such a random selection control parameter provides a finer degree of control than possibly course priority level control.

Control over the downloading process by the source computer is further enhanced when the broadcast message includes data specifying a range of times within which any target computer qualifying from that broadcast message should download the computer file. In this way, the source computer is able to exercise further control over the way in which the target computers respond to the broadcast messages and protect itself from overloading.

Whilst it will be appreciated that the technique of the present invention could be usefully used in the downloading of many different sorts of computer files, the invention is particularly useful in the downloading of virus definition data to anti-virus computer programs. The peak demands for the downloading of virus definition data can be large and considerable advantages can be gained in the overall level of virus protection achieved if the downloading mechanisms are able to allocate the downloading resource available to the most critical and/or vulnerable computer systems early within the availability of new virus definition data.

As a further technique for providing feedback control of the downloading process preferred embodiments of the invention may also provide a method in which said download controlling message includes a retry message, said method comprising the steps of:

sending a download request from one of said plurality of target computers to said source computer, said download request including information identifying said one of said plurality of target computers;

receiving at said source computer said download request from said one of said plurality of target computers;

if said demand level is less than a predetermined threshold level, then sending said computer file from said source computer to said one of said plurality of target computers;

if said demand level is greater than said predetermined threshold level, then sending said retry message to said one of said plurality of target computers indicating a delay period after which said one of said plurality of target computers may reissue said download request to said source computer; and upon expiry of said delay period reissuing said download request from said one of said plurality of target computers to said source computer.

A reissued download request should include information uniquely identifying the target computer and possibly also, in preferred embodiments, information regarding a priority level of the target computer, the number of time the target computer has made a request, the time of the last request etc.

It will be appreciated that within the context of computer file distribution via a computer network, the source computer and the target computer may be physically separated by a considerable distance. The source computer and the target computer may even be in different countries or on different sides of the planet. In this context, it will be appreciated that the invention is also embodied within the source computer and the target computer operation, structure and computer programs themselves.

Viewed from another aspect the invention also provides apparatus for distributing a computer file from a source computer to a plurality of target computers via a computer network, said apparatus comprising:

first determining logic operable to determine a demand level upon said source computer for downloading of said computer file to said plurality of target computers;

transmitting logic operable to send at least one download controlling message from said source computer to at least one of said plurality of target computers;

a controller operable to control downloading of said computer file by said at least one of said plurality of target computers in dependence upon said download controlling message; and adjusting logic operable to adjust said downloading controlling message in dependence upon said demand level.

Viewed from a further aspect the invention also provides computer program product carrying a computer program for controlling a computer to distribute a computer file from a source computer to a plurality of target computers via a computer network, said computer program product comprising:

first determining code operable to determine a demand level upon said source computer for downloading of said computer file to said plurality of target computers;

transmitting code operable to send at least one download controlling message from said source computer to at least one of said plurality of target computers;

a controller operable to control downloading of said computer file by said at least one of said plurality of target computers in dependence upon said download controlling message; and adjusting code operable to adjust said downloading controlling message in dependence upon said demand level.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
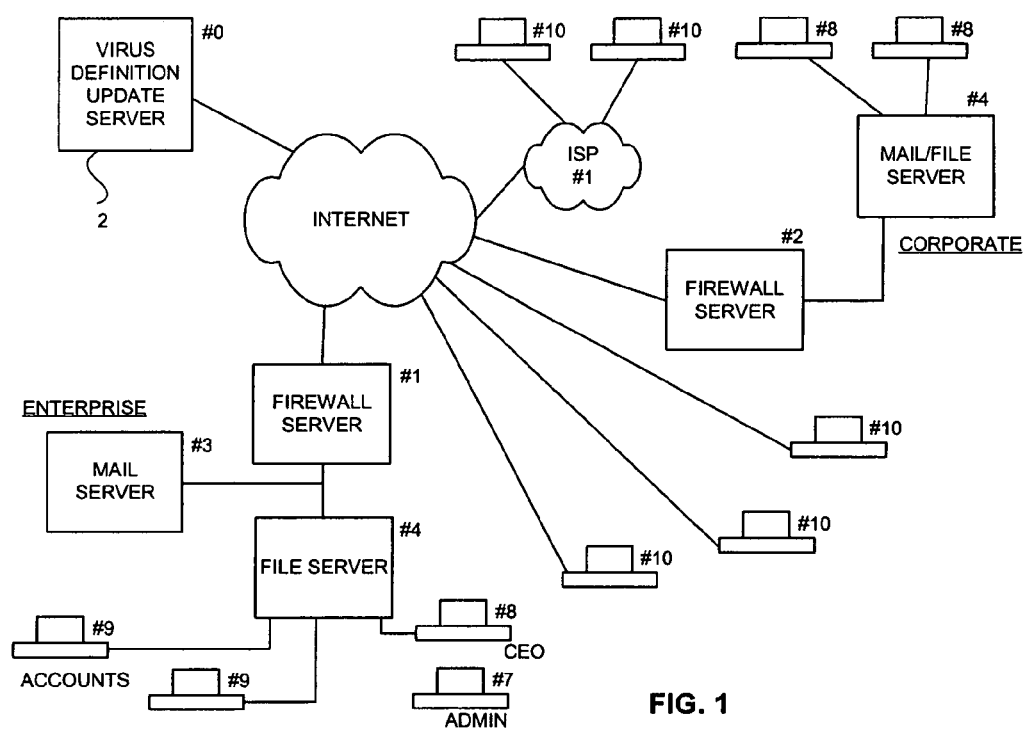
FIG. 1 schematically illustrates a computer network over which downloading of a computer file may take place.

FIG. 1 illustrates a computer network linked via internet and corporate network links. Within this network a virus definition update server 2 is maintained by the provider of an anti-virus computer program. When new virus definition data becomes available it is placed upon this virus definition update server 2 from where it may be downloaded by the users of the anti-virus computer program. The users may be classified as enterprise, corporate, ISP, individual or in other ways. These different categories of users will have their respective target computers that require updating with the computer file containing the virus definition data. Different priority levels may be associated with the different target computers involved. Accordingly, a firewall server within an enterprise organisation may be given a high priority #1 as will the relay download source within an ISP (internet service provider). The firewall server within the enterprise organisation is given a high priority as it is the frontline virus defence for a large and critical computer network. The ISP is given a high priority as once the updated virus definition data has been downloaded to the ISP, then users of the ISP may obtain the updated file from the ISP itself rather than seeking to download it from the virus definition update server 2. This offloads some of the downloading work from the virus definition update server 2 in an advantageous manner.

A corporate organisation may also have a firewall server but this may be allocated a priority #2 as it serves as protection for a smaller number of users and from a purely quantitative risk point of view is less critical than the firewall server within the enterprise organisation.

Individual users who may download their virus definition update data directly from the virus definition update server or from the relay server within an ISP are given a relatively low priority of #10.

As is illustrated within the enterprise organisation, different target computers within that enterprise organisation may in turn be given different priorities at levels set by the system administrators within that enterprise organisation. The system administrators may chose to set their mail server to have a priority of #3 and their file server to have a priority of #4. The enterprise organisation will have a finite bandwidth link to the virus definition update server 2 and accordingly may wish to ensure that their mail server is updated before their file server if they regard the mail server as more critical. Within the users of that enterprise organisation, the administrator's workstation may be given a priority that ensures that it is updated before other users as if there are consequential problems that arise from the updated virus definition data, then it is preferable that these occur first for the administrator user as they may then be able to prevent further downloads or implement a suitable fix. Priorities within other users may be set in accordance with the assessment of the risk faced by a particular user (e.g. do they receive much external e-mail) and by the importance of protecting the computer system concerned.

Figure 2:
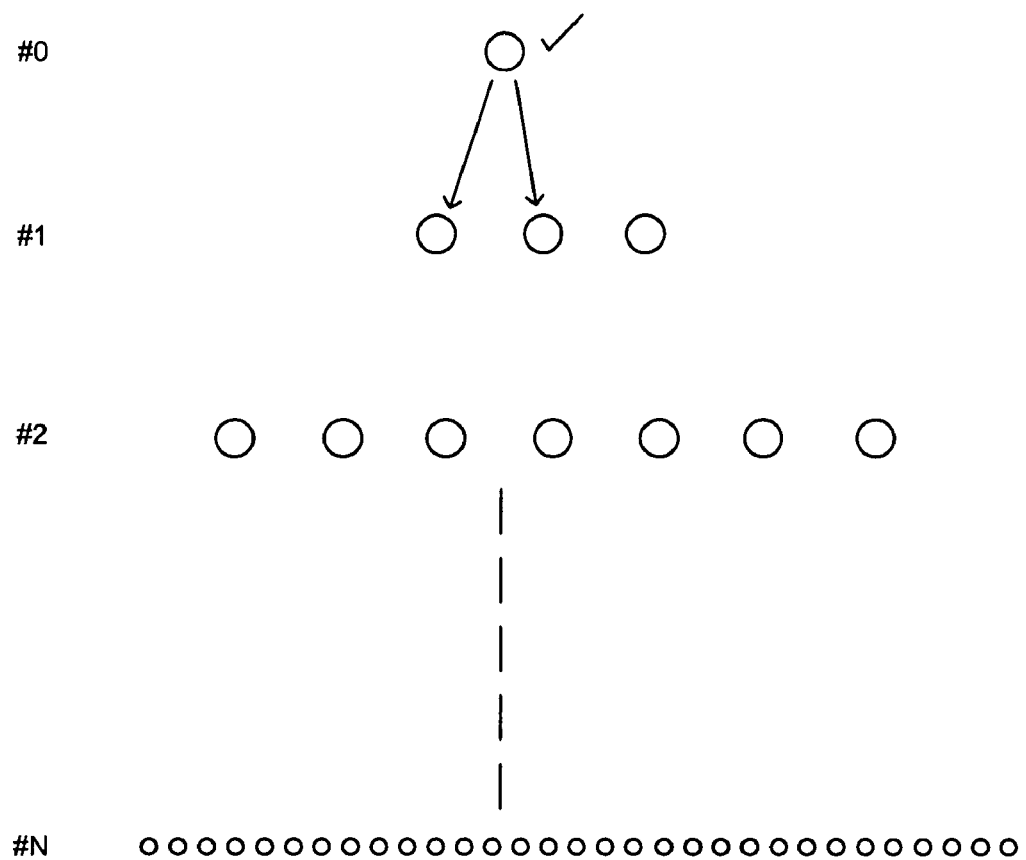
FIGS. 2, 3 and 4 schematically illustrate how downloading of a computer file may progress with time within a network of target computers arranged within a priority hierarchy.

FIG. 2 illustrates a priority hierarchy of computers. At the top level is the source computer upon which the virus definition update data is first made available. Beneath this top level are arranged the various target computers in accordance with their priority level. Generally speaking, the lower the priority level, the greater the number of target computers that have that priority level. Thus, whilst there may be relatively few firewall target computers within enterprise or organisations and ISP update relaying servers, there will be a large number of individual users at the lower levels within the priority hierarchy.

FIG. 2 shows that the source computer at level #0 is the first to receive the computer file for downloading. The source computer then broadcasts a message using an internet message broadcasting mechanism that is received by those target computers currently switched on and connected to the internet. The target computers will run a small agent program that serves to continuously monitor a particular broadcast address. The first broadcast message issued by the source computer will indicated that only target computers having the very highest priority level #1 will qualify for download and even then will include a seed value for a random selection process within the target computers that will mean that a relatively small number of even these high priority target computers will initially qualify for the download.

When the target computers receive the broadcast message, they compare their priority level with that included within the broadcast message. If they are at a lower level than indicated within the broadcast message, then they do not attempt to download. If the target computers have a matching or higher priority level than is indicated in the broadcast message, then they may use the random selection control parameter within the broadcast message to determine based upon a quasi-random parameter they generate themselves whether or not they qualify for the download. As an example of this quasi-random control, the broadcast message may include a number between 1 and 1,000,000. A target computer that qualifies by virtue of its priority level, will then quasi-randomly generate for itself a number within the range of 1 to 1,000,000. If the number generated by the target computer exceeds that embedded within the broadcast message, then that target computer qualifies for download and will attempt to make a download. In this way, by progressively lowering the number embedded within the broadcast message from close to 1,000,000 down towards a lower number, the relative probability of a target computer that qualifies by virtue of its priority level also qualifying by this random process can be increased with a fine degree of control.

Returning to FIG. 1, this indicates that the early stages in the process two of the level #1 target computers qualify for downloading and download the computer file from the source computer.

Figure 3:
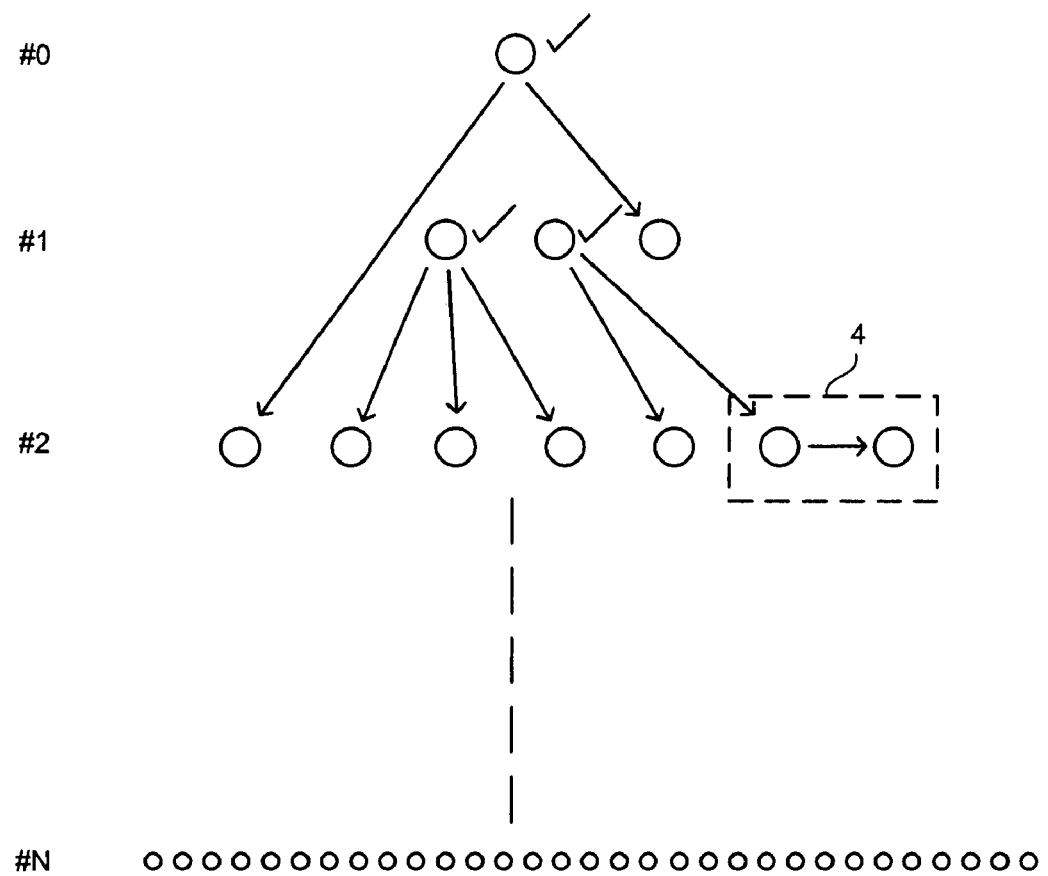

FIG. 3 illustrates how downloading progresses further with the broadcast message now indicating that priority levels down to #2 qualify for download. Remaining priority level #1 target computers may be updated during this period as well as priority level #2 target computers. Some of the priority level #2 target computers may obtain their computer files from previously updated priority level #1 target computers that are now themselves switched to become source computers and act to also issue broadcast messages. The dotted line 4 indicates the portion of an internal enterprise network in which priority level piers may update one another.

Figure 4:
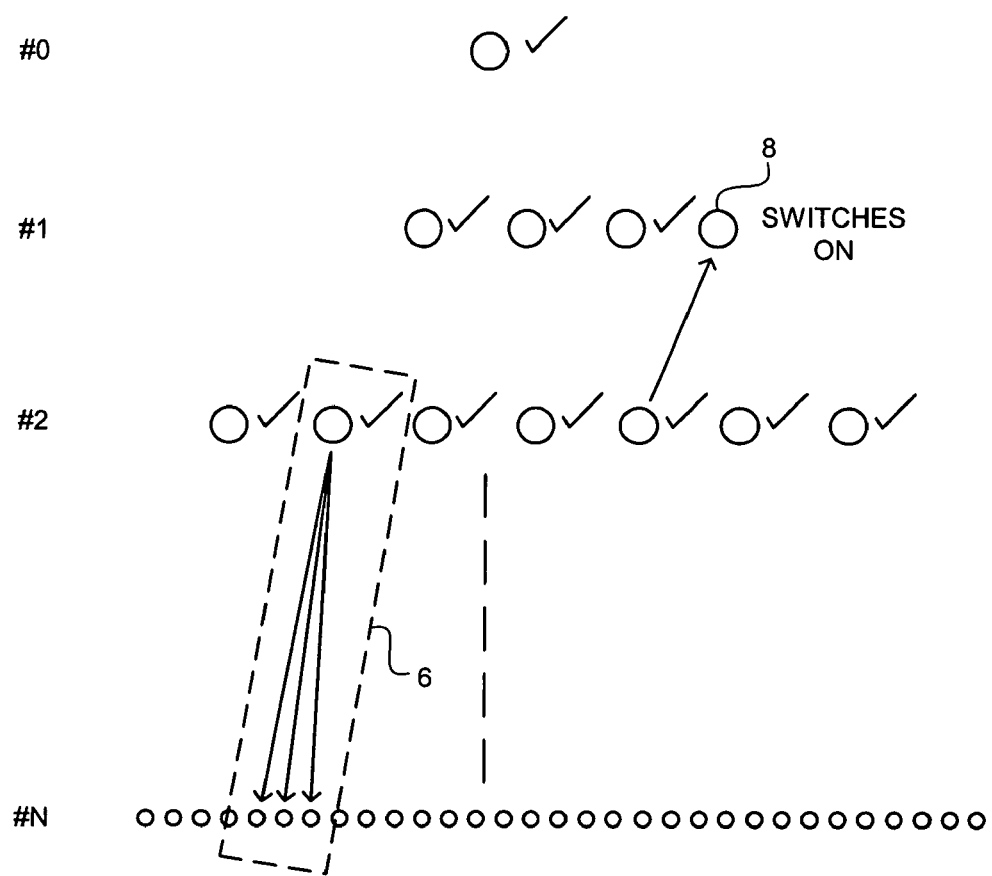

FIG. 4 illustrates a time later in the progress of the distribution of the new computer file. The dotted line 6 indicates an organisation such as an ISP which may include an update relaying server to which individual users for that ISP may connect to obtain their computer file. Back at priority level #1, a new target computer 8 is switched on for the first time since the new computer file became available. The first broadcast message that this target computer 8 receives in fact comes from a computer having a lower priority level than itself, but one that has already been updated and is now serving as a source computer. Accordingly, this illustrates how an update may also flow upwards within the priority hierarchy.

Figure 5:
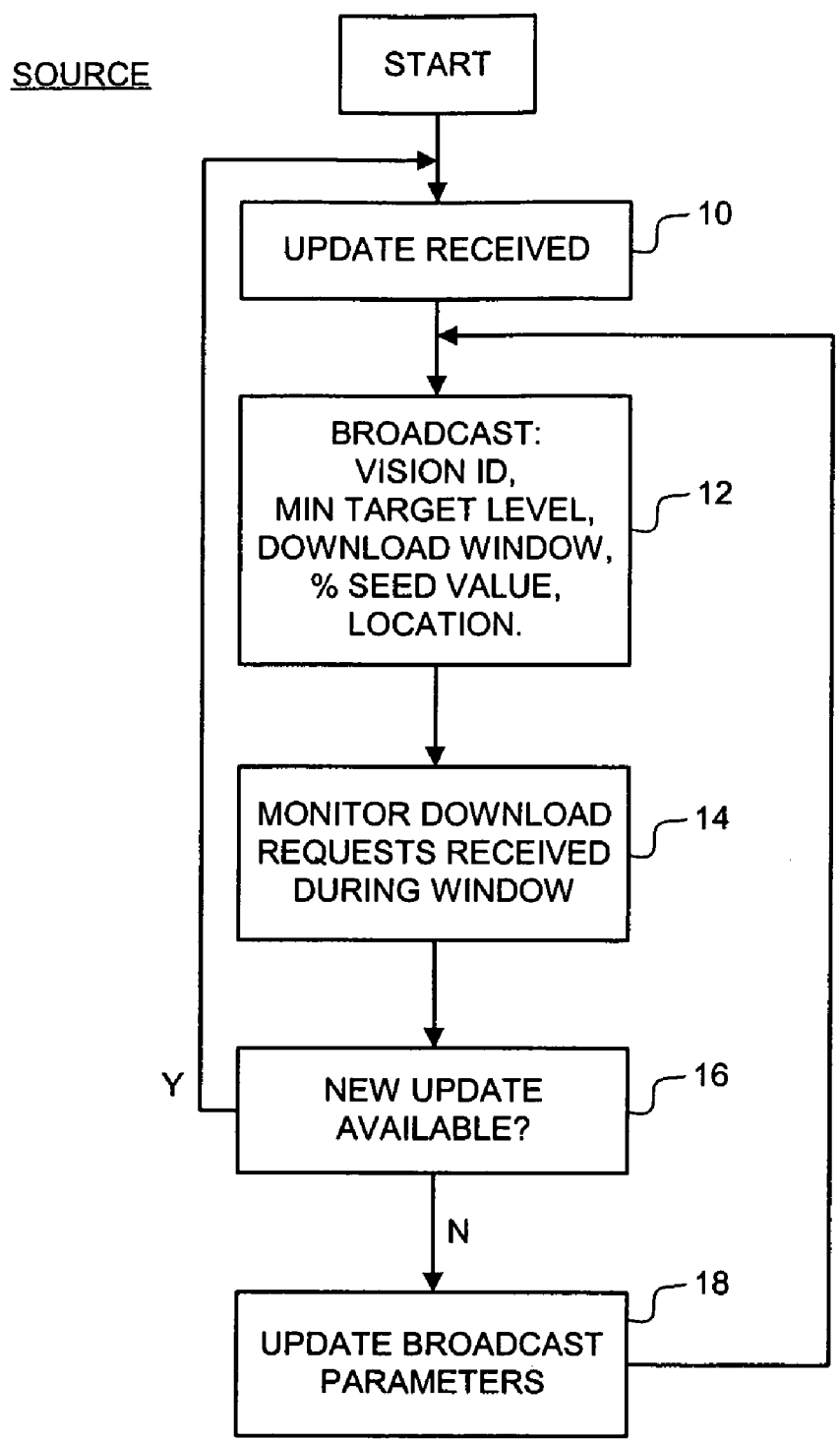
FIG. 5 is a flow diagram illustrating processing within a source computer.

FIG. 5 is a flow diagram illustrating the processing that may occur within a system serving as a source computer. At step 10 a computer file having an updated form is received by the source computer. The source computer is then triggered to start broadcasting messages at step 12. These broadcast messages include information identifying the version of the computer file to which the broadcast message relates (this enables receiving target computers to determine whether or not they already have that version of the computer file), a minimum target level priority for target computers to qualify for downloading in response to that broadcast message, a download time window specifying a range of time within which target computers qualifying by that broadcast message must attempt their download, a random selection control parameter value for controlling the quasi-random selection operations within the target computers and an address location of the source computer such that the target computers can direct their download requests to the originator of the broadcast message concerned.

At step 14, the source computer serves to monitor the number of download requests received during the download time window. At step 16, a check is made as to whether or not the computer file concerning which the broadcast messages are being issued is still the most up-to-date version of that computer file and accordingly broadcast messages either should or should not continue based upon that version of the computer file.

If broadcast messages are to continue based upon that version of a computer file, then step 18 uses the information regarding how may target computers downloaded the computer file in response to the last broadcast message to generate download qualifying parameters (e.g. minimum priority levels and random seed values) for use within a next broadcast message. Processing is then returned to step 12 where that next broadcast message is issued.

It will be seen that steps 12, 14 and 18 together provide a feedback loop whereby the download qualifying parameters within the broadcast messages may be adjusted to hold the number of target computers downloading within a given download time window at a level with which the source computer can cope.

Figure 6:
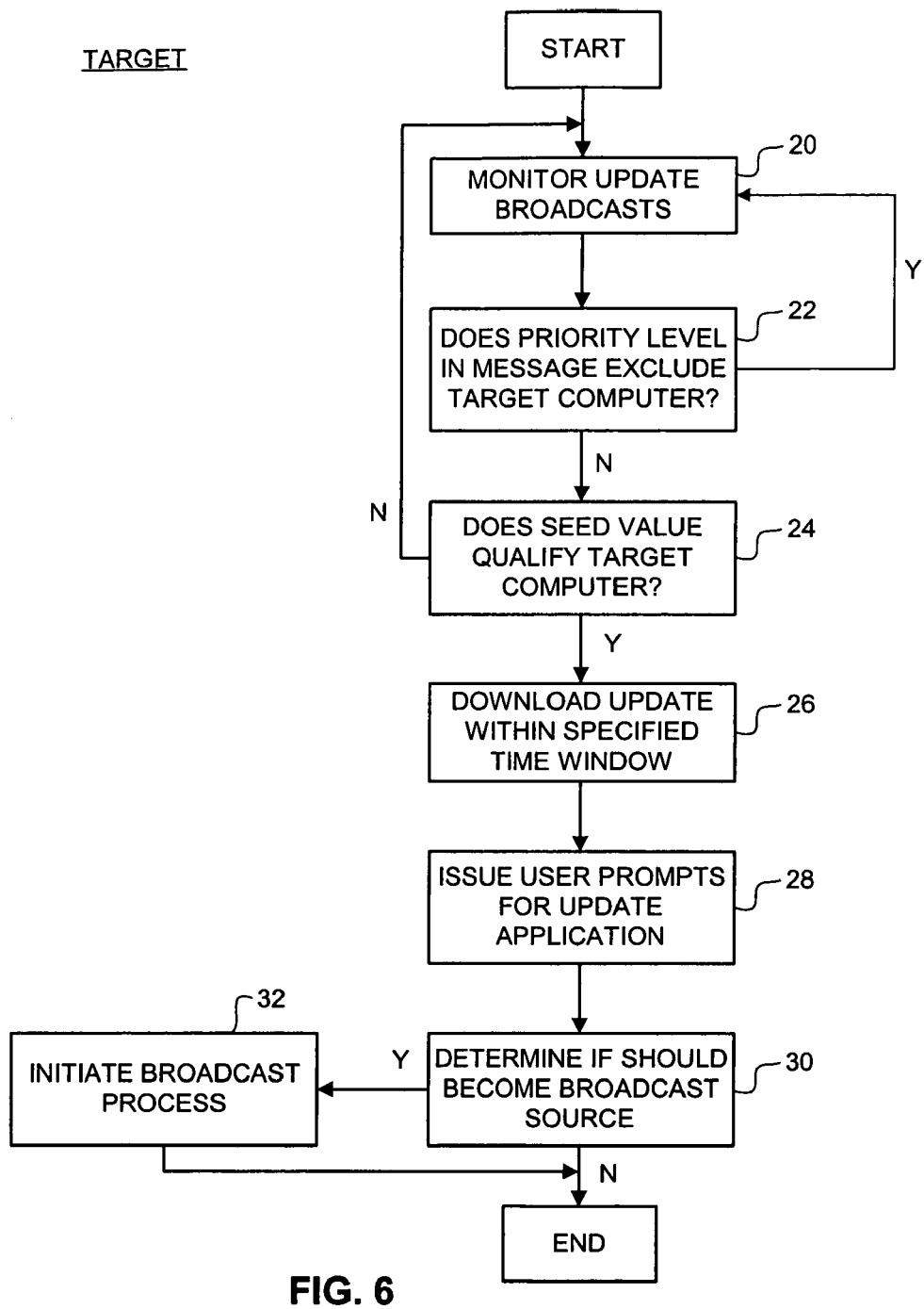
FIG. 6 is a flow diagram illustrating processing within a target computer.

FIG. 6 is a flow diagram illustrating the processing performed by a target computer. At step 20 the target computer monitors for receipt of a broadcast message. When a broadcast message is received, then processing proceeds to step 22 at which a check is made for whether or not the priority level indicated within the broadcast message excludes the target computer concerned. If the target computer is excluded, then it ignores the broadcast message and processing returns to step 20 where monitoring for another broadcast message is continued.

If the determination at step 22 indicates that the target computer is not excluded on the basis of priority level, then processing proceeds to step 24. Step 24 includes a determination of whether or not the target computer qualifies based upon a quasi-random number generated by the target computer. This quasi-random number is compared with a seed value number within the broadcasting message and the target computer qualified if the number it generated exceeds this seed value number. If the target computer did not qualify, then processing again returns to step 20 to await the next broadcast message.

If the target computer has passed the two qualifying determinations of steps 22 and 24, then processing proceeds to step 26 at which the computer file is downloaded from the source computer. This download takes place starting at a quasi-random time selected by the target computer within the time window specified within the broadcast message triggering this download.

At step 28, the computer file has been successfully downloaded and the target computer issues prompts to a user asking for input specifying how that downloaded computer file should be used. The user may be given options to install it immediately, defer installing it or discard it. If desired, a user may preconfigure their target computer to automatically install downloaded computer files. It will be appreciated that how the downloaded file is used by the target computer may vary from situation to situation and the invention is not limited to one particular way the downloaded file is used by the target computer. As an example a target computer may attach as a relay computer that does not itself use the computer file but rather serves as a further source for the computer file for other target computers in a way that lessens the download demand upon the original source computer.

At step 30, a determination is made as to whether or not the target computer should now switch to act as a source computer since it now itself has a copy of the computer file which may be required by other target computers connected to it. Generally speaking, only target computers relatively high within the priority hierarchy will switch to act as source computers once they receive a computer file. As an example, when a server within an ISP receives an updated virus definition data file, then it may switch to become a source computer for that updated virus definition data file so that customers of that ISP that then wish to obtain a copy of the computer file may do so directly from that ISP itself without placing load upon the external connections of the ISP or the source computer of the originator of the computer file.

If the target computer is to switch to become a source computer, then the broadcasting processes are initiated at step 32. If the target computer is not to become a broadcasting source computer, then processing terminates.

As an alternative to or in addition to the above described broadcast message technique, the invention may be used in a system in which a download request sent from a target computer to a source computer triggers the source computer to either grant that request or return a message to the target computer indicating a delay period after which the target computer should retry the request. The source computer can in this way reduce the problems of overloading by stopping target computers making repeated requests for a file until there is a reasonable prospect of meeting those requests. Dealing with requests for downloads, as well as trying to service those downloads, may in itself lead to overloading of a source computer. Controlling target computers not to retry a refused request for a specified delay period reduces the likelihood of overload from those requests. An indication may also be given to a user of the target computer of when their request for the computer file is likely to be met rather than merely refusing the download.

A target computer may be allocated a position within a queue for downloading the file upon their first request with the delay period returned reflecting the position within that queue, i.e. the message indicated that the computer can retry and receive the file after a specified time period. A more sophisticated approach can use the priority hierarchy techniques discussed above, whereby high priority target computers will either have their download requests immediately satisfied or be given a short delay period after which their request will be met. Conversely, low priority level computers will be sent long delay periods. Given such a priority based approach, there may be no guarantee that after the delay period specified a download will be granted as further high priority target computers may have made requests in the intervening period.

The download qualifying parameter technique may also be used in combination with the delay period technique, e.g. target computers may be triggered to request a download by a broadcast message including a qualifying parameter and then demand from the responding target computers regulated using the delay period technique.

Figure 7:
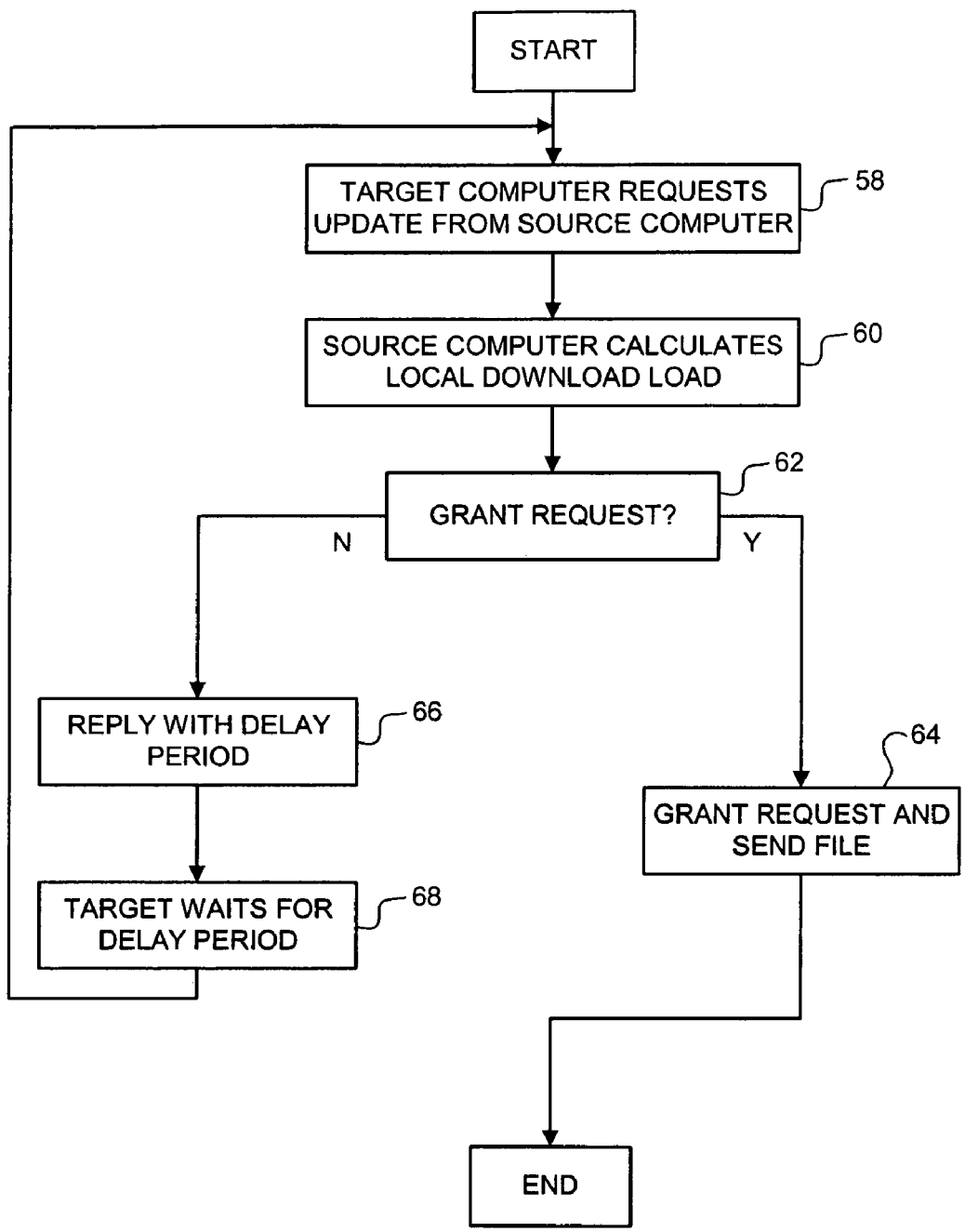
FIG. 7 is a flow diagram illustrating an alternative technique for controlling download demand.

FIG. 7 illustrates the above technique. At step 58, a target computer issues a download request to a source computer including an identification of the target computer (this request could, for example, have been triggered by a broadcast message indicating availability of the update together with a download qualifying parameter that the particular target computer passed). At step 60, a source computer calculates the current download load it is handling and determines at step 62 whether or not to grant the request. If the request is granted, then processing proceeds to step 64 at which the file sent to the target computer. If the request is not granted, then processing proceeds to step 66 at which a reply is sent by the source computer to the target computer indicating that the request has been refused and specifying a delay a period after which the target computer may reissue its download request. At step 68, the target computer waits for the specified delay period before processing returns to step 58 and the download request is reissued.

Figure 8:
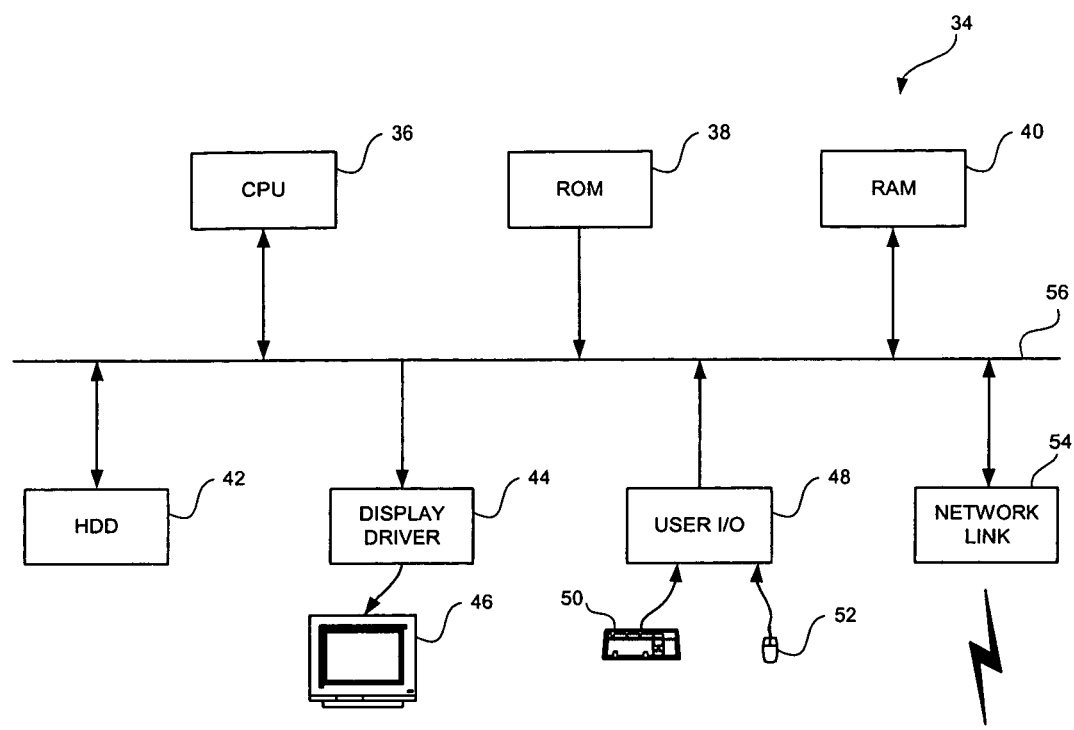
FIG. 8 schematically illustrates a general purpose computer of the type that may be used to implement the above techniques.

FIG. 8 schematically illustrates a general purpose computer 34 of the type that may be used to implement the techniques described above. The general purpose computer 34 includes a central processing unit 36, a read only memory 38, a random access memory 40, a hard disk drive 42, a display driver 44 and display 46, a user input/output unit 48 and keyboard 50 and mouse 52, a network link unit 54 and a common shared bus 56.

In operation the central processing unit 36 executes computer program instructions that may be stored within one or more of the read only memory 38, the random access memory 40 or on the hard disk drive 42. The computer program instructions may also be downloaded into the general purpose computer 34 via the network link unit 54. The display driver 44 is used to display the results of processing activity to a user via the display 46. User inputs controlling the operation of the general purpose computer 34 are received by the user input/output unit 48 from the keyboard 50 and the mouse 52.

The computer program executing upon the general purpose computer 34 may be considered to be formed of various routines providing computer code for implementing different portions of the functionality described above. The general purpose computer 34 may be controlled by this computer software to function as a source computer, a target computer or both. The computer program may be loaded into the general purpose computer 34 using a computer program storage medium such as a compact disk or floppy disk or may be downloaded via the network link unit 54.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A method of distributing a computer file from a source computer to a plurality of target computers via a computer network, said method comprising the steps of:

determining a demand level upon said source computer for downloading of said computer file to said plurality of target computers;

sending at least one download controlling message from said source computer to at least one of said plurality of target computers, the download controlling message including at least one download qualifying parameter, wherein said at least one download qualifying parameter is adjusted such that a probability that a particular target computer will qualify to download said computer file on the basis of said at least one download qualifying parameter increases as time progresses, wherein a number of target computers not having said computer file decreases as time progresses;

controlling downloading of said computer file by said at least one of said plurality of target computers in dependence upon said download controlling message; and adjusting said downloading controlling message in dependence upon said demand level;

wherein said download controlling message is sent from said source computer to said target computers, in order to control the manner in which said target computers request said downloading of said computer file:

wherein said download controlling message includes a broadcast message, said method comprising the steps of:

issuing said broadcast message from said source computer to said plurality of target computers indicating availability of said computer file for download from said source computer, said broadcast message including the at least one download qualifying parameter:

receiving said broadcast message at said plurality of target computer:

determining for each target computer of said plurality of target computers that received said broadcast message whether or not said target computer already has said computer file;

determining for each target computer that does not already have said computer file in dependence upon said at least one download qualifying parameter whether or not said target computer qualifies to download said computer file in response to said broadcast message:

downloading said computer file from said source computer to those target computers that do not already have said computer file and that qualify to download said computer file;

monitoring how many target computers download said computer file in response to said broadcast message; and adjusting at least one download parameter used in a following broadcast message issued by said source computer in dependence upon how many target computers downloaded said computer file in response to said broadcast message;

wherein said at least one download qualifying parameter includes a random selection control parameter used in combination with a quasi-random parameter generated by a particular target computer to control whether or not said particular target computer qualifies to download said computer file;

wherein said broadcast message includes time range data specifying a range of times within which target computers qualifying to download said computer file in response to said broadcast message should download said computer file;

wherein each target computer that qualifies to download said target file in response to said broadcast message initiates downloading at a time quasi-randomly selected within said range of time;

wherein a target computer that has downloaded said computer file subsequently acts as a source computer;

wherein upon receipt of said computer file said target computer issues prompts seeking user input specifying how said computer file should be used;

wherein said computer file is a virus definition data file for use by an anti-virus computer program.

2. A method as claimed in claim 1, wherein said at least one download qualifying parameter is adjusted such that a number of target computers downloading said computer file in response to said broadcast message does not exceed a threshold level.

3. A method as claimed in claim 1, wherein each target computer has a priority level parameter indicating a position within a priority hierarchy and said at least one download qualifying parameter specifies which priority level parameters a target computer must have to qualify to download said computer file.

4. A method as claimed in claim 1, wherein said broadcast message includes a network address of said source computer.

5. A method as claimed in claim 1, wherein at least portions of said computer network comprise internet network links.

6. A method of sending a computer file from a source computer to a plurality of target computers via a computer network, said method comprising the steps of:

determining a demand level upon said source computer for downloading of said computer file to said plurality of target computers;

sending at least one download controlling message from said source computer to at least one of said plurality of target computers, said download controlling message being usable to control downloading of said computer file by said at least one of said plurality of target computers in dependence upon said download controlling message, the download controlling message including at least one download qualifying parameter, wherein said at least one download qualifying parameter is adjusted such that a probability that a particular target computer will qualify to download said computer file on the basis of said at least one download qualifying parameter increases as time progresses, wherein a number of target computers not having said computer file decreases as time progresses; and adjusting said downloading controlling message in dependence upon said demand level;

wherein said download controlling message is sent from said source computer to said target computers, in order to control the manner in which said target computers request said downloading of said computer file;

wherein said download controlling message includes a broadcast message, said method comprising the steps of:

issuing said broadcast message from said source computer to said plurality of target computers indicating availability of said computer file for download from said source computer, said broadcast message including the at least one download qualifying parameter that controls whether or not a target computer that receives said broadcast message and does not already have said computer file qualifies to download said computer file from said source computer in response to said broadcast message:

monitoring how many target computers download said computer file in response to said broadcast message; and adjusting at least one download qualifying parameter used in a following broadcast message issued by said source computer in dependence upon how many target computers downloaded said computer file in response to said broadcast message;

wherein said at least one download qualifying parameter includes a random selection control parameter used in combination with a quasi-random parameter generated by a particular target computer to control whether or not said particular target computer qualifies to download said computer file:

wherein said broadcast message includes time range data specifying a range of times within which target computers qualifying to download said computer file in response to said broadcast message should download said computer file;

wherein each target computer that qualifies to download said target file in response to said broadcast message initiates downloading at a time quasi-randomly selected within said range of time;

wherein a target computer that has downloaded said computer file subsequently acts as a source computer;

wherein upon receipt of said computer file said target computer issues prompts seeking user input specifying how said computer file should be used;

wherein said computer file is a virus definition data file for use by an anti-virus computer program.

7. A method of downloading a computer file from a source computer to a target computer via a computer network, said method comprising the steps of:

receiving at said target computer a download controlling message from said source computer, the download controlling message including at least one download qualifying parameter, wherein said at least one download qualifying parameter is adjusted such that a probability that a particular target computer will qualify to download said computer file on the basis of said at least one download qualifying parameter increases as time progresses, wherein a number of target computers not having said computer file decreases as time progresses; and controlling sending of download requests from said target computer to said source computer in dependence upon said download controlling message;

wherein said download controlling message is sent from said source computer to a plurality of said target computers, in order to control the manner in which said target computers request said downloading of said computer file;

wherein said download controlling message is a broadcast message, said method comprising the steps of:

receiving said broadcast message from said source computer at said target computer, said broadcast message indicating availability of said computer file for download from said source computer and including the at least one download qualifying parameter;

determining whether or not said target computer already has said computer file;

if said target computer does not already have said computer file, then determining in dependence upon said at least one download qualifying parameter whether or not said target computer qualifies to download said computer file in response to said broadcast message;

if said target computer qualities to download said computer file in response to said broadcast message, then downloading said computer file from said source computer to said target computer; and if said target computer does not qualify to download said computer file, then waiting for a next broadcast message;

wherein said at least one download qualifying parameter includes a random selection control parameter used in combination with a quasi-random parameter generated by a particular target computer to control whether or not said particular target computer qualifies to download said computer file;

wherein said broadcast message includes time range data specifying a range of times within which target computers qualifying to download said computer file in response to said broadcast message should download said computer file;

wherein each target computer that qualifies to download said target file in response to said broadcast message initiates downloading at a time quasi-randomly selected within said range of time;

wherein a target computer that has downloaded said computer file subsequently acts as a source computer;

wherein upon receipt of said computer file said target computer issues prompts seeking user input specifying how said computer file should be used;

wherein said computer file is a virus definition data file for use by an anti-virus computer program.

8. Apparatus for distributing a computer file from a source computer to a plurality of target computers via a computer network, said apparatus comprising:

first determining logic operable to determine a demand level upon said source computer for downloading of said computer file to said plurality of target computers;

transmitting logic operable to send at least one download controlling message from said source computer to at least one of said plurality of target computers, the download controlling message including at least one download qualifying parameter, wherein said at least one download qualifying parameter is adjusted such that a probability that a particular target computer will qualify to download said computer file on the basis of said at least one download qualifying parameter increases as time progresses, wherein a number of target computers not having said computer file decreases as time progresses;

a controller operable to control downloading of said computer file by said at least one of said plurality of target computers in dependence upon said download controlling message; and adjusting logic operable to adjust said downloading controlling message in dependence upon said demand level;

wherein said download controlling message is sent from said source computer to said target computers, in order to control the manner in which said target computers download said computer file;

wherein said download controlling message includes a broadcast message, said apparatus comprising:

broadcasting logic operable to issue a broadcast message from said source computer to said plurality of target computers indicating availability of said computer file for download from said source computer, said broadcast message including the at least one download qualifying parameter:

a receiver operable to receive said broadcast message at said plurality of target computer;

second determining logic operable to determine for each target computer of said plurality of target computers that received said broadcast message whether or not said target computer already has said computer file;

third determining logic operable to determine for each target computer that does not already have said computer file in dependence upon said at least one download qualifying parameter whether or not said target computer qualifies to download said computer file in response to said broadcast message;

downloading logic operable to download said computer file from said source computer to those target computers that do not already have said computer file and that qualify to download said computer file;

monitoring logic operable to monitor how many target computers download said computer file in response to said broadcast message; and adjusting logic operable to adjust an at least one download parameter used in a following broadcast message issued by said source computer in dependence upon how many target computers downloaded said computer file in response to said broadcast message;

wherein said at least one download qualifying parameter includes a random selection control parameter used in combination with a quasi-random parameter generated by a particular target computer to control whether or not said particular target computer qualifies to download said computer file;

wherein said broadcast message includes time range data specifying a range of times within which target computers qualifying to download said computer file in response to said broadcast message should download said computer file;

wherein each target computer that qualifies to download said target file in response to said broadcast message initiates downloading at a time quasi-randomly selected within said range of time;

wherein a target computer that has downloaded said computer file subsequently acts as a source computer;

wherein upon receipt of said computer file said target computer issues prompts seeking user input specifying how said computer file should be used;

wherein said computer file is a virus definition data file for use by an anti-virus computer program.

9. Apparatus as claimed in claim 8, wherein said at least one download qualifying parameter is adjusted such that a number of target computers downloading said computer file in response to said broadcast message does not exceed a threshold level.

10. Apparatus as claimed in claim 8, wherein each target computer has a priority level parameter indicating a position within a priority hierarchy and said at least one download qualifying parameter specifies which priority level parameters a target computer must have to qualify to download said computer file.

11. Apparatus as claimed in claim 8 wherein said broadcast message includes a network address of said source computer.

12. Apparatus as claimed in claim 8, wherein at least portions of said computer network comprise internet network links.

13. A source computer for sending a computer file to a plurality of target computers via a computer network, said source computer comprising:

determining logic operable to determine a demand level upon said source computer for downloading of said computer file to said plurality of target computers;

transmitting logic operable to send at least one download controlling message from said source computer to at least one of said plurality of target computers, said download controlling message being usable to control downloading of said computer file by said at least one of said plurality of target computers in dependence upon said download controlling message, the download controlling message including at least one download qualifying parameter, wherein said at least one download qualifying parameter is adjusted such that a probability that a particular target computer will qualify to download said computer file on the basis of said at least one download qualifying parameter increases as time progresses, wherein a number of target computers not having said computer file decreases as time progresses; and adjusting logic operable to adjust said downloading controlling message in dependence upon said demand level;

wherein said download controlling message is sent from said source computer to said target computers, in order to control the manner in which said target computers download said computer file;

wherein said download controlling message includes a broadcast message, said source computer comprising:

broadcast transmitting logic operable to issue said broadcast message from said source computer to said plurality of target computers indicating availability of said computer file for download from said source computer, said broadcast message including the at least one download qualifying parameter that controls whether or not a target computer that receives said broadcast message and does not already have said computer file qualifies to download said computer file from said source computer in response to said broadcast message;

monitoring logic operable to monitor how many target computers download said computer file in response to said broadcast message; and parameter adjusting logic operable to adjust an at least one download qualifying parameter used in a following broadcast message issued by said source computer in dependence upon how many target computers downloaded said computer file in response to said broadcast message;

wherein said at least one download qualifying parameter includes a random selection control parameter used in combination with a quasi-random parameter generated by a particular target computer to control whether or not said particular target computer qualifies to download said computer file;

wherein said broadcast message includes time range data specifying a range of times within which target computers qualifying to download said computer file in response to said broadcast message should download said computer file;

wherein each target computer that qualifies to download said target file in response to said broadcast message initiates downloading at a time quasi-randomly selected within said range of time;

wherein a target computer that has downloaded said computer file subsequently acts as a source computer;

wherein upon receipt of said computer file said target computer issues prompts seeking user input specifying how said computer file should be used;

wherein said computer file is a virus definition data file for use by an anti-virus computer program.

14. A target computer for downloading a computer file from a source computer to a target computer via a computer network, said target computer comprising:

a receiver operable to receive a download controlling message from said source computer, the download controlling message including at least one download qualifying parameter, wherein said at least one download qualifying parameter is adjusted such that a probability that a particular target computer will qualify to download said computer file on the basis of said at least one download qualifying parameter increases as time progresses, wherein a number of target computers not having said computer file decreases as time progresses; and a controller operable to control sending of download requests from said target computer to said source computer in dependence upon said download controlling message;

wherein said download controlling message is sent from said source computer to said target computer, in order to control the manner in which said target computer requests said downloading of said computer file;

wherein said download controlling message is a broadcast message, said target computer comprising:

a broadcast receiver operable to receive said broadcast message from said source computer at said target computer, said broadcast message indicating availability of said computer file for download from said source computer and including the at least one download qualifying parameter;

first determining logic operable to determine whether or not said target computer already has said computer file;

second determining logic operable if said target computer does not already have said computer file, to determine in dependence upon said at least one download qualifying parameter whether or not said target computer qualifies to download said computer file in response to said broadcast message;

third determining logic operable if said target computer qualifies to download said computer file in response to said broadcast message, to download said computer file from said source computer to said target computer and operable if said target computer does not qualify to download said computer file, to wait for a next broadcast message;

wherein said at least one download qualifying parameter includes a random selection control parameter used in combination with a quasi-random parameter generated by a particular target computer to control whether or not said particular target computer qualifies to download said computer file;

wherein said broadcast message includes time range data specifying a range of times within which target computers qualifying to download said computer file in response to said broadcast message should download said computer file;

wherein each target computer that qualifies to download said target file in response to said broadcast message initiates downloading at a time quasi-randomly selected within said range of time;

wherein a target computer that has downloaded said computer file subsequently acts as a source computer;

wherein upon receipt of said computer file said target computer issues prompts seeking user input specifying how said computer file should be used;

wherein said computer file is a virus definition data file for use by an anti-virus computer program.

15. A computer program product carrying a computer program for controlling a computer to distribute a computer file from a source computer to a plurality of target computers via a computer network, said computer program product comprising:

first determining code operable to determine a demand level upon said source computer for downloading of said computer file to said plurality of target computers;

transmitting code operable to send at least one download controlling message from said source computer to at least one of said plurality of target computers, the download controlling message including at least one download qualifying parameter, wherein said at least one download qualifying parameter is adjusted such that a probability that a particular target computer will qualify to download said computer file on the basis of said at least one download qualifying parameter increases as time progresses, wherein a number of target computers not having said computer file decreases as time progresses;

a controller operable to control downloading of said computer file by said at least one of said plurality of target computers in dependence upon said download controlling message; and adjusting code operable to adjust said downloading controlling message in dependence upon said demand level;

wherein said download controlling message is sent from said source computer to said target computers, in order to control the manner in which said target computers download said computer file;

wherein said download controlling message includes a broadcast message, said computer program product comprising:

broadcasting code operable to issue a broadcast message from said source computer to said plurality of target computers indicating availability of said computer file for download from said source computer, said broadcast message including the at least one download qualifying parameter;

receiver logic operable to receive said broadcast message at said plurality of target computer;

second determining code operable to determine for each target computer of said plurality of target computers that received said broadcast message whether or not said target computer already has said computer file;

third determining code operable to determine for each target computer that does not already have said computer file in dependence upon said at least one download qualifying parameter whether or not said target computer qualifies to download said computer file in response to said broadcast message;

downloading code operable to download said computer file from said source computer to those target computers that do not already have said computer file and that qualify to download said computer file;

monitoring code operable to monitor how many target computers download said computer file in response to said broadcast message; and adjusting code operable to adjust at least one download parameter used in a following broadcast message issued by said source computer in dependence upon how many target computers downloaded said computer file in response to said broadcast message;

wherein said at least one download qualifying parameter includes a random selection control parameter used in combination with a quasi-random parameter generated by a particular target computer to control whether or not said particular target computer qualifies to download said computer file;

wherein said broadcast message includes time range data specifying a range of times within which target computers qualifying to download said computer file in response to said broadcast message should download said computer file;

wherein each target computer that qualifies to download said target file in response to said broadcast message initiates downloading at a time quasi-randomly selected within said range of time;

wherein a target computer that has downloaded said computer file subsequently acts as a source computer;

wherein upon receipt of said computer file said target computer issues prompts seeking user input specifying how said computer file should be used;

wherein said computer file is a virus definition data file for use by an anti-virus computer program.

16. A computer program product as claimed in claim 15, wherein said at least one download qualifying parameter is adjusted such that a number of target computers downloading said computer file in response to said broadcast message does not exceed a threshold level.

17. A computer program product as claimed in claim 15 wherein each target computer has a priority level parameter indicating a position within a priority hierarchy and said at least one download qualifying parameter specifies which priority level parameters a target computer must have to qualify to download said computer file.

18. A computer program product as claimed in claim 15, wherein said broadcast message includes a network address of said source computer.

19. A computer program product as claimed in claim 15, wherein at least portions of said computer network comprise internet network links.

20. A computer program product for controlling a source computer to send a computer file to a plurality of target computers via a computer network, said computer program product comprising:

determining code operable to determine a demand level upon said source computer for downloading of said computer file to said plurality of target computers;

transmitting code operable to send at least one download controlling message from said source computer to at least one of said plurality of target computers, said download controlling message being usable to control downloading of said computer file by said at least one of said plurality of target computers in dependence upon said download controlling message, the download controlling message including at least one download qualifying parameter, wherein said at least one download qualifying parameter is adjusted such that a probability that a particular target computer will qualify to download said computer file on the basis of said at least one download qualifying parameter increases as time progresses, wherein a number of target computers not having said computer file decreases as time progresses; and adjusting code operable to adjust said downloading controlling message in dependence upon said demand level;

wherein said download controlling message is sent from said source computer to said target computers, in order to control the manner in which said target computers download said computer file;

wherein said download controlling message includes a broadcast message said source computer comprising:

broadcast transmitting code operable to issue said broadcast message from said source computer to said plurality of target computers indicating availability of said computer file for download from said source computer, said broadcast message including the at least one download qualifying parameter that controls whether or not a target computer that receives said broadcast message and does not already have said computer file qualifies to download said computer file from said source computer in response to said broadcast message;

monitoring code operable to monitor how many target computers download said computer file in response to said broadcast message; and parameter adjusting code operable to adjust an at least one download qualifying parameter used in a following broadcast message issued by said source computer in dependence upon how many target computers downloaded said computer file in response to said broadcast message;

wherein said at least one download qualifying parameter includes a random selection control parameter used in combination with a quasi-random parameter generated by a particular target computer to control whether or not said particular target computer qualifies to download said computer file;

wherein said broadcast message includes time range data specifying a range of times within which target computers qualifying to download said computer file in response to said broadcast message should download said computer file;

wherein each target computer that qualifies to download said target file in response to said broadcast message initiates downloading at a time quasi-randomly selected within said range of time:

wherein a target computer that has downloaded said computer file subsequently acts as a source computer;

wherein upon receipt of said computer file said target computer issues prompts seeking user input specifying how said computer file should be used;

wherein said computer file is a virus definition data file for use by an anti-virus computer program.

21. A computer program product for controlling a target computer to download a computer file from a source computer to a target computer via a computer network, said computer program product comprising:

receiver code operable to receive a download controlling message from said source computer, the download controlling message including at least one download qualifying parameter, wherein said at least one download qualifying parameter is adjusted such that a probability that a particular target computer will qualify to download said computer file on the basis of said at least one download qualifying parameter increases as time progresses, wherein a number of target computers not having said computer file decreases as time progresses; and control code operable to control sending of download requests from said target computer to said source computer in dependence upon said download controlling message;

wherein said download controlling message is sent from said source computer to said target computer, in order to control the manner in which said target computer requests said downloading of said computer file;

wherein said download controlling message is a broadcast message, said computer program product comprising:

broadcast receiver code operable to receive said broadcast message from said source computer at said target computer, said broadcast message indicating availability of said computer file for download from said source computer and including the at least one download qualifying parameter:

first determining code operable to determine whether or not said target computer already has said computer file;

second determining code operable if said target computer does not already have said computer file, to determine in dependence upon said at least one download qualifying parameter whether or not said target computer qualifies to download said computer file in response to said broadcast message;

third determining code operable if said target computer qualifies to download said computer file in response to said broadcast message, to download said computer file from said source computer to said target computer and operable if said target computer does not qualify to download said computer file, to wait for a next broadcast message;

wherein said at least one download qualifying parameter includes a random selection control parameter used in combination with a quasi-random parameter generated by a particular target computer to control whether or not said particular target computer qualifies to download said computer file;

wherein said broadcast message includes time range data specifying a range of times within which target computers qualifying to download said computer file in response to said broadcast message should download said computer file;

wherein each target computer that qualifies to download said target file in response to said broadcast message initiates downloading at a time quasi-randomly selected within said range of time;

wherein a target computer that has downloaded said computer file subsequently acts as a source computer;

wherein upon receipt of said computer file said target computer issues prompts seeking user input specifying how said computer file should be used;

wherein said computer file is a virus definition data file for use by an anti-virus computer program.

* * * * *